(12) United States Patent
Koyama

(10) Patent No.: US 8,570,666 B2
(45) Date of Patent: Oct. 29, 2013

(54) LENS BARREL AND IMAGE-TAKING APPARATUS

(75) Inventor: Takashi Koyama, Tokyo (JP)

(73) Assignee: Sony Corporation (JP)

( * ) Notice: Subject to any disclaimer, the term of this patent is extended or adjusted under 35 U.S.C. 154(b) by 161 days.

(21) Appl. No.: 13/066,940

(22) Filed: Apr. 28, 2011

(65) Prior Publication Data

US 2011/0273788 A1    Nov. 10, 2011

(30) Foreign Application Priority Data

May 10, 2010    (JP) ............................... P2010-108801

(51) Int. Cl.
*G02B 15/14*    (2006.01)
*G02B 7/02*    (2006.01)

(52) U.S. Cl.
USPC .......................................... 359/704; 359/822

(58) Field of Classification Search
USPC ......................................... 359/704, 822–823
See application file for complete search history.

(56) References Cited

U.S. PATENT DOCUMENTS

2003/0184880 A1* 10/2003 Kawanabe ................... 359/704

FOREIGN PATENT DOCUMENTS

JP    2003-307667 A    10/2003

* cited by examiner

*Primary Examiner* — Alicia M Harrington
(74) *Attorney, Agent, or Firm* — Lerner, David, Littenberg, Krumholz & Mentlik, LLP

(57) ABSTRACT

A lens barrel according to an embodiment of the present invention includes a fixed barrel, a movable member that is movable relative to the fixed barrel, a flexible circuit board that is bent in a U-shape and hangs between the fixed barrel and the movable member, and a flexible circuit board guide. The flexible circuit board guide secures one side of the flexible circuit board that is continuous with the bent portion of the flexible circuit board to the fixed barrel while the one side of the flexible circuit board extends in a moving direction of the movable member.

4 Claims, 17 Drawing Sheets

LENS BARREL AND IMAGE-TAKING APPARATUS

CROSS-REFERENCE TO RELATED APPLICATION

The present application claims priority from Japanese Patent Application No. JP 2010-108801 filed in the Japanese Patent Office on May 10, 2010, the entire content of which is incorporated herein by reference.

BACKGROUND OF THE INVENTION

1. Field of the Invention

The present invention relates to a lens barrel and an image-taking apparatus equipped with the lens barrel. The lens barrel includes a fixed barrel and a movable member that includes electronic components mounted therein. The fixed barrel and the movable member are electrically connected to each other through a flexible circuit board.

2. Description of the Related Art

In general, a lens barrel includes one or more fixed barrel and one or more movable barrel in order to perform functions such as zooming and focusing. In such a fixed or movable barrel, one or more lenses are secured or removably supported. In such a lens barrel, when electronic components are mounted on the movable barrel, and a power source or power source components are arranged on the fixed barrel side, the power source and the like and the electronic components are electrically connected by a flexible circuit board. The flexible circuit board is routed with an intermediate portion thereof bent in a U-shape. The U-turn portion absorbs a change in the length of the flexible circuit board in order to allow the movement of the movable barrel relative to the fixed barrel.

Presently, there is such a lens barrel, for example, as described in Japanese Unexamined Patent Application Publication No. 2003-307667. The above document discloses a technology related to a lens barrel including electronic circuitry mounted therein and a lens holding member that is extendable and retractable relative to a lens barrel body. The lens barrel according to the above document includes a first lens holding member, a second lens holding member, and a flexible circuit board. The first lens holding member includes lens groups, holds a first lens group, and is extendable and retractable relative to the lens barrel body. The second lens holding member holds a second lens group, includes a flexible circuit board for electrical connection, and is movable in the optical axis direction. The flexible circuit board has a U-turn portion, an end of the bent portion of which moves in the optical axis direction in accordance with the movement of the second lens holding member.

With the lens barrel having a structure as described above, the movement of the U-turn portion of the flexible circuit board is achieved only with a front unit structure including the first lens holding member. This should reduce the difficulty in assembly and the probability of wrong assembly such as the U-turn flexible circuit board protruding into the optical path (see paragraph [0044] of the above document).

However, in the related-art lens barrel described above, the U-turn flexible circuit board is secured to a flexible circuit board presser plate having a substantially U-shape using double-sided tape or the like so as to be placed at a predetermined longitudinal position. The bent portion is moved in accordance with the movement of an aperture unit in the optical axis direction. Since only a bottom portion of the U-turn flexible circuit board is secured with the flexible circuit board presser plate, the U-turn flexible circuit board is easily cut, and variations in the dimensional precision of the flexible circuit board presser and the like causes variations in positional precision of the bent portion. As a result, variations of positional precision of the bent portion of the U-turn flexible circuit board occur. This may cause the bent portion to contact movable lens groups. Thus, there still are problems such as a problem of the flexible circuit board being cut, a problem of the high probability of generation of noise (also called as a "snap sound") due to interference, and so forth.

The details of the above problems are described as follows. When a flexible circuit board is bent with a radius of curvature of a certain degree of largeness, the flexible circuit board is able to exhibit sufficient durability even with a repetitive external force (pulling force, compressive force, or the like) acting on the bent portion. However, the flexible circuit board generally has a small bending resistance. For this reason, the flexible circuit board, which has been bent with a radius of curvature that is sufficiently small to make a crease therein and then returned to a flat state, is comparatively easily damaged and the circuitry thereof is easily broken when a pulling force, a compressive force, or the like repetitively acts on the flexible circuit board.

Accordingly, with a method as disclosed in the above document, in which the flexible circuit board is bent into an S-shape and supported at the S-shape bent portion with the flexible circuit board presser plate, a portion with a small radius of curvature may be comparatively easily damaged. In addition, one side of the flexible circuit board continuous with the S-shape bent portion is secured to a CCD holder, and another side of the flexible circuit board continuous with the S-shape bent portion is secured to a second lens holding barrel. Accordingly, the S-shape bent portion set in an intermediate portion of the flexible circuit board is easily shaken in a direction intersecting with a moving direction of the second lens holding barrel. As a result, when the amount of bending of the S-shape bent portion increases, the S-shape portion may interfere with other components, thereby causing the flexible circuit board to be cut and generating noise due to a short-circuit.

SUMMARY OF THE INVENTION

Problems to be solved are as follows. That is, in the related-art lens barrel, a flexible circuit board is secured to a flexible circuit board presser plate having substantially a U-shape using double-sided tape or the like so as to be placed at a predetermined longitudinal position. A bent portion of the flexible circuit board is moved in accordance with the movement of an aperture unit in the optical axis direction. Since only a bottom portion of the flexible circuit board is secured with the flexible circuit board presser plate, the flexible circuit board lacks strength, and variations in the dimensional precision of the flexible circuit board presser and the like cause variations in positional precision of the bent portion. As a result, variations of positional precision of the bent portion of the flexible circuit board occur. This may cause the bent portion to contact movable lens groups. Thus, there still are problems such as a problem of the flexible circuit board being cut, a problem of noise being generated due to interference, and so forth.

A lens barrel according to an embodiment of the present invention includes a fixed barrel, a movable member that is movable relative to the fixed barrel, a flexible circuit board that is bent in a U-shape and hangs between the fixed barrel and the movable member, and a flexible circuit board guide. The flexible circuit board guide secures one side of the flexible circuit board that is continuous with the bent portion of the flexible circuit board to the fixed barrel while the one side of the flexible circuit board extends in a moving direction of the movable member.

An image-taking apparatus according to the embodiment of the present invention includes a lens barrel and a main body of the image-taking apparatus to which the lens barrel is secured or detachably attached. In the image-taking apparatus, the lens barrel includes a fixed barrel, a movable member that is movable relative to the fixed barrel, a flexible circuit board that is bent in a U-shape and hangs between the fixed barrel and the movable member, and a flexible circuit board guide. The flexible circuit board guide secures one side of the flexible circuit board that is continuous with the bent portion of the flexible circuit board to the fixed barrel while the one side of the flexible circuit board extends in a moving direction of the movable member.

With the lens barrel according to the embodiment of the present invention, the risk that the flexible circuit board may interfere with the movable member is avoided, and by stabilizing the reaction force of the flexible circuit board, the risk of the occurrence of image blurring is reduced. Furthermore, the flexible circuit board is able to be secured to the fixed barrel only by the insertion of the flexible circuit board guide. This allows ease of assembly to be improved due to the securing structure that does not use fixing screws, and the entire apparatus is allowed to be reduced in size due to the utilization of dead space.

DESCRIPTION OF THE PREFERRED EMBODIMENTS

One side of a flexible circuit board that is continuous with a rounded portion of the flexible circuit board extends in a moving direction of a movable member and secured to a fixed barrel with a flexible circuit board guide. By doing this, a lens barrel is achieved with a simple structure, with which the risk of the flexible circuit board being damaged due to contact with other components is suppressed. This lens barrel also facilitates assembly work and accordingly improves assemblability.

Embodiment

Figure 19:
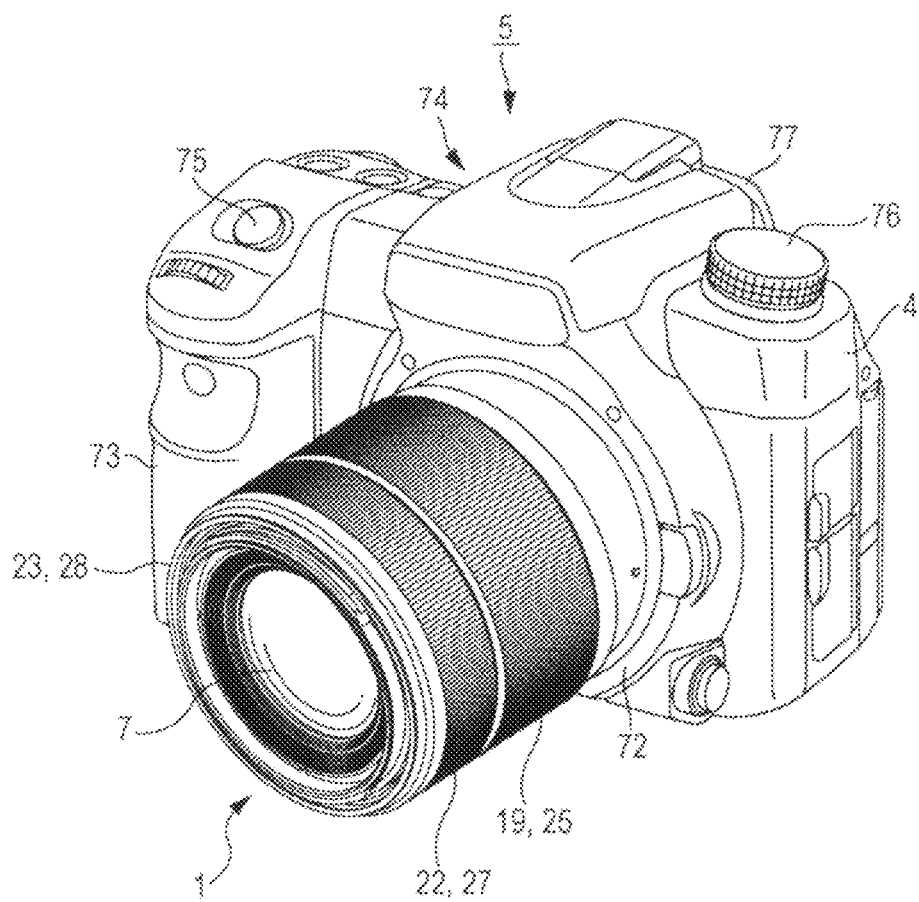
FIG. 19 is a perspective view illustrating the appearance of a digital still camera that indicates an example of the embodiment equipped with the lens barrel illustrated in FIG. 1.

An embodiment according to the present invention will be described below with reference to the accompanying drawings. A lens barrel 1 illustrated in FIGS. 1 to 7 is an example of a first embodiment of the present invention. The lens barrel 1 is designed as an interchangeable lens used with a single lens reflex digital still camera (referred to as the "digital still camera" hereafter). As illustrated in FIG. 19, the lens barrel 1 is connected to a camera body 4, which is a specific example of a main body of an image-taking apparatus, thereby defining a digital still camera 5, which is a specific example of the image-taking apparatus. The lens barrel 1 and the camera body 4 each include control circuitry mounted therein. The control circuitry allows image taking to be performed while power is supplied and an information signal is transferred through electrical contacts.

The lens barrel 1 includes an imaging optical system including optical elements such as a plurality of lenses and filters; a mechanical system including barrels, rings, and frames that secure or movably support the elements of the imaging optical system; and the control circuitry (not shown). Although the mechanical system of the lens barrel 1 is manually operated, the mechanical system may also be configured as an automatically operating system by providing a driving system including a motor and gears.

As illustrated in FIGS. 4 to 7, the imaging optical system of the lens barrel 1 includes three lens groups, that is, a first lens group 7, a second lens group 8, and a third lens group 9 disposed in this order from an object side. The first lens group 7 is supported by a first group moving frame 11, the second lens group 8 is supported by a second group moving frame 12, and the third lens group 9 is supported by a third group moving frame 13 and so forth.

Figure 1:
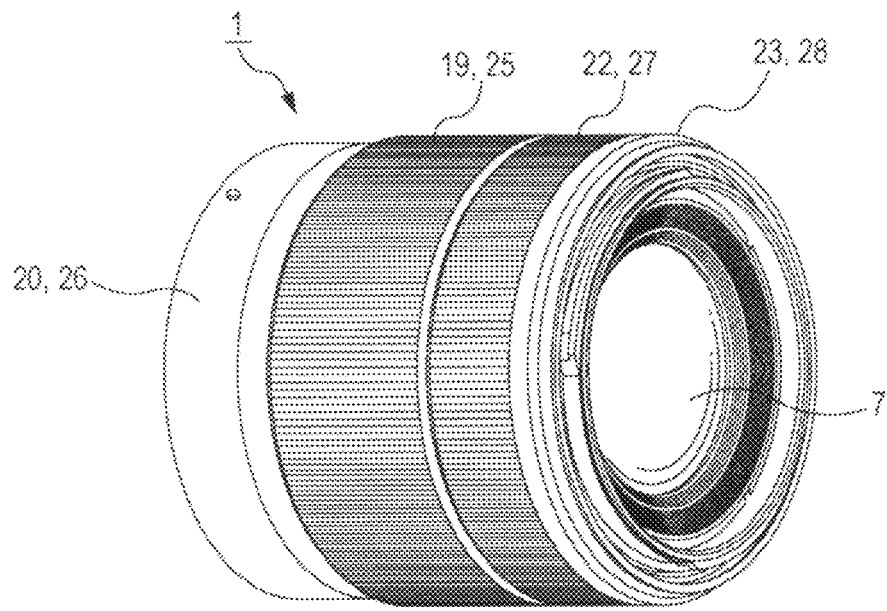
FIG. 1 is a perspective view illustrating the appearance of an example of a lens barrel in a retracted state according to an embodiment of the present invention.
Figure 2:
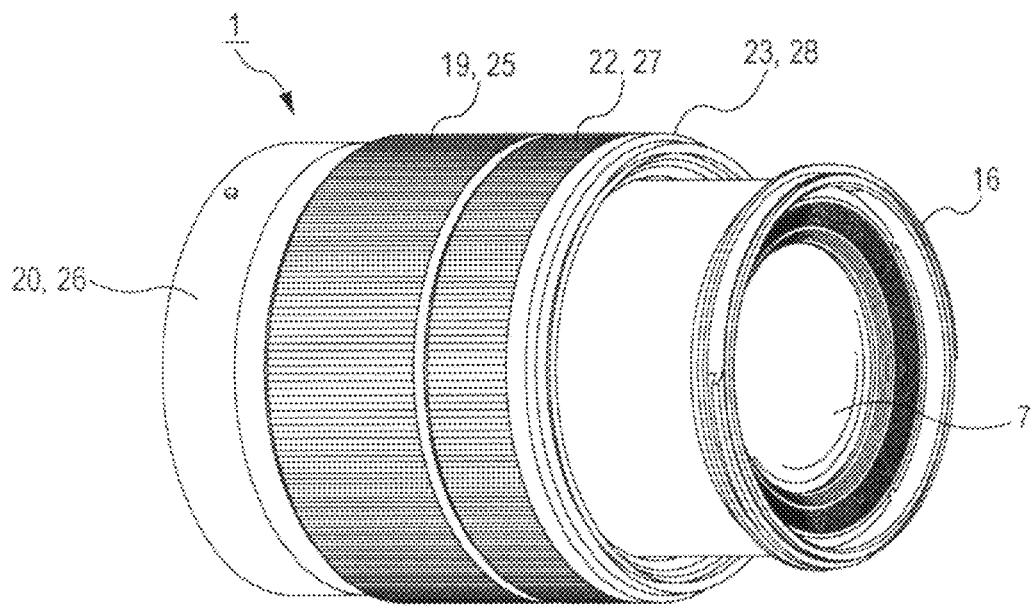
FIG. 2 is a perspective view of the lens barrel illustrated in FIG. 1 in an extended (telephoto) state.
Figure 3:
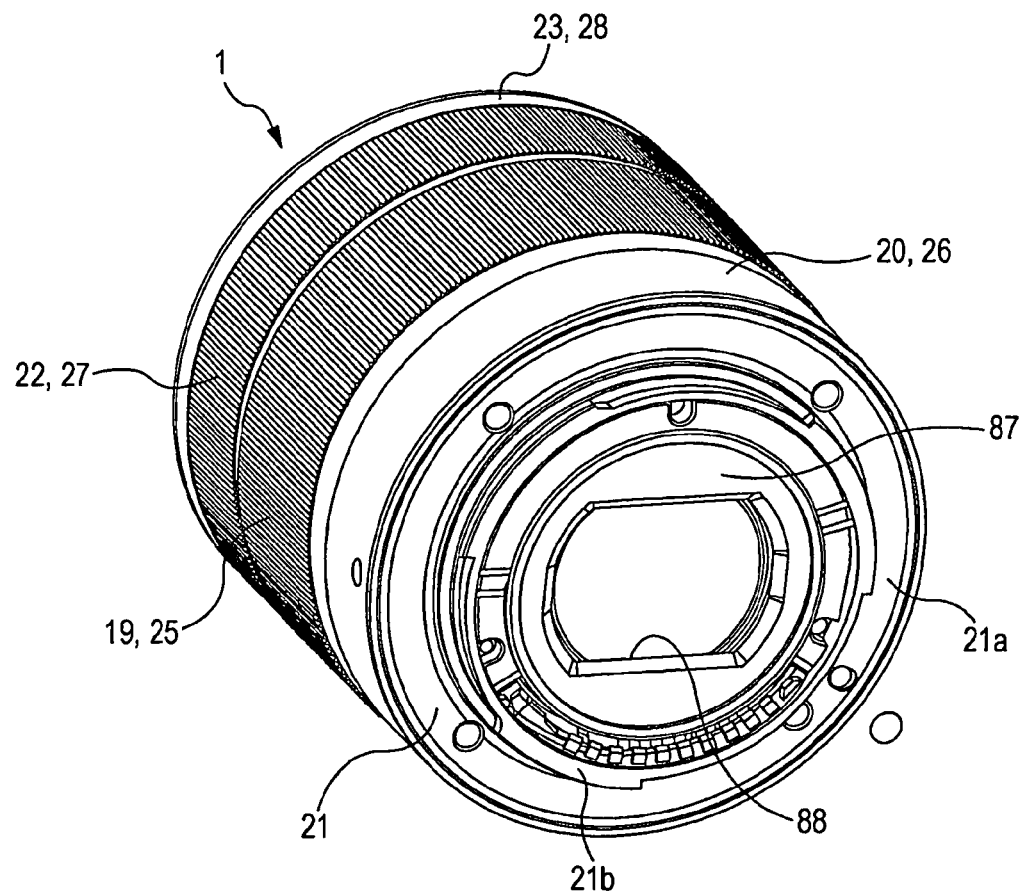
FIG. 3 is a perspective view of the lens barrel illustrated in FIG. 1 seen from the rear side.
Figure 4:
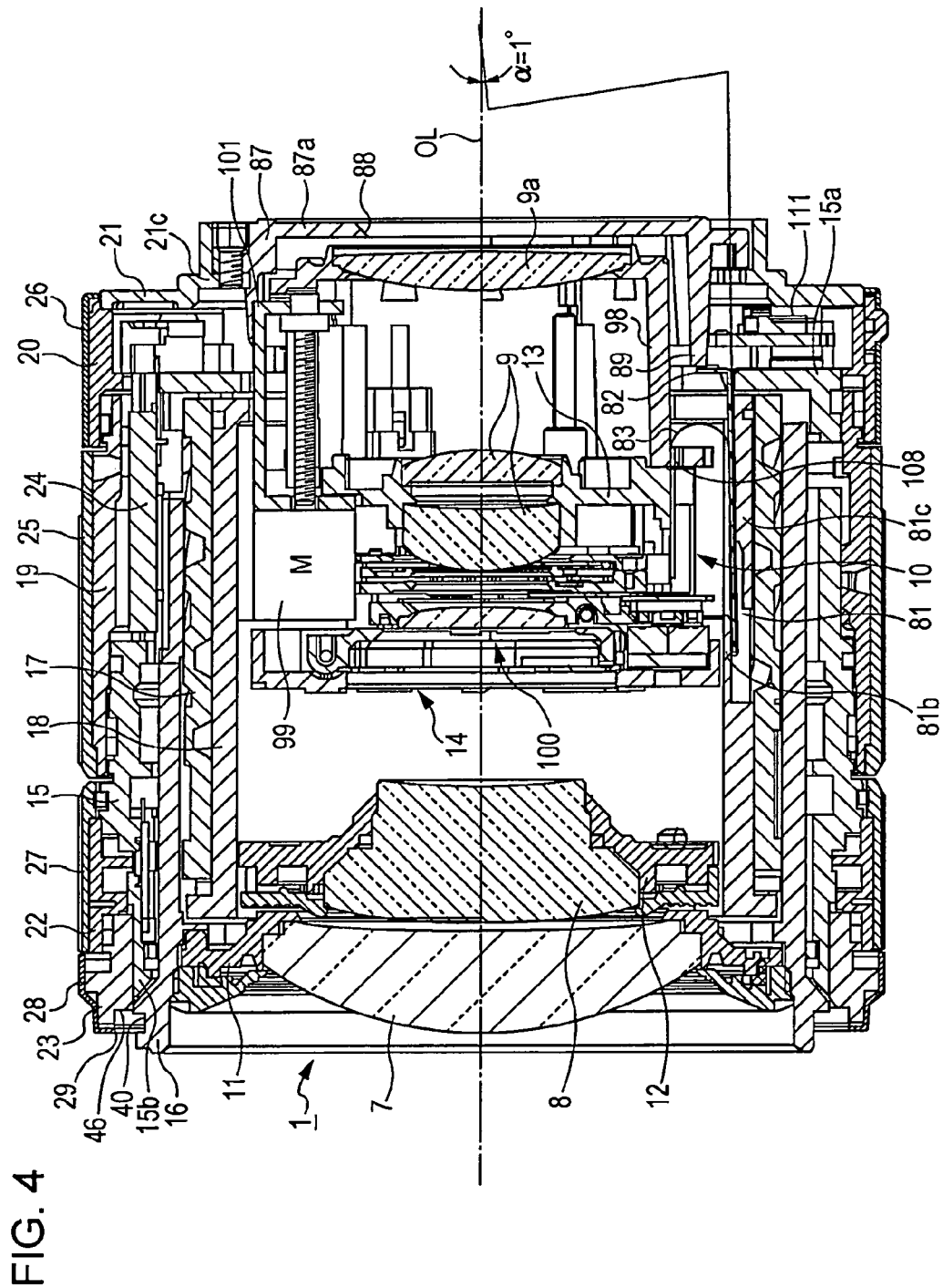
FIG. 4 is a longitudinal sectional view of the lens barrel illustrated in FIG. 1 in the retracted state.
Figure 6:
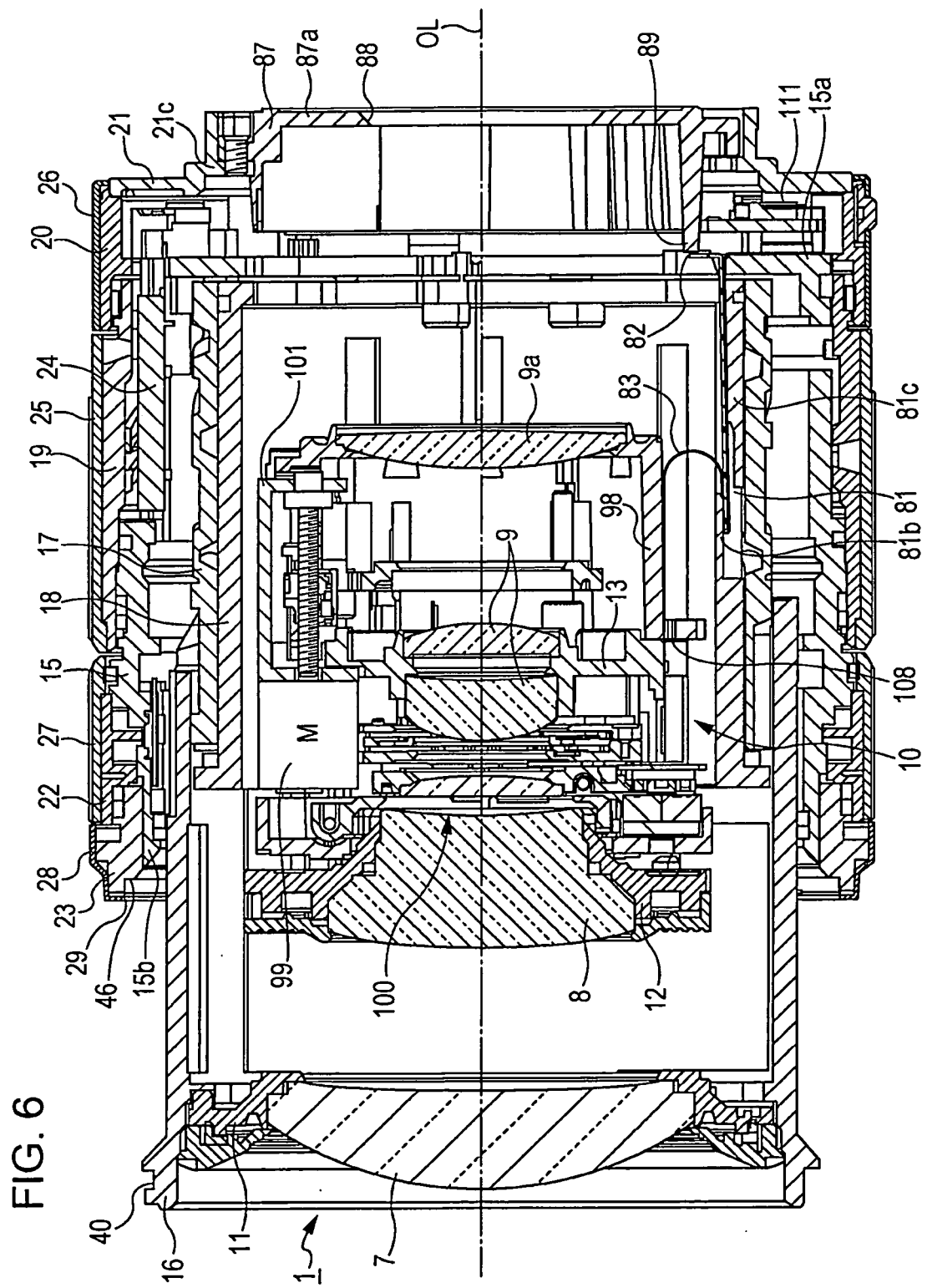
FIG. 6 is a longitudinal sectional view of the lens barrel illustrated in FIG. 1 in the extended (telephoto) state.
Figure 7:
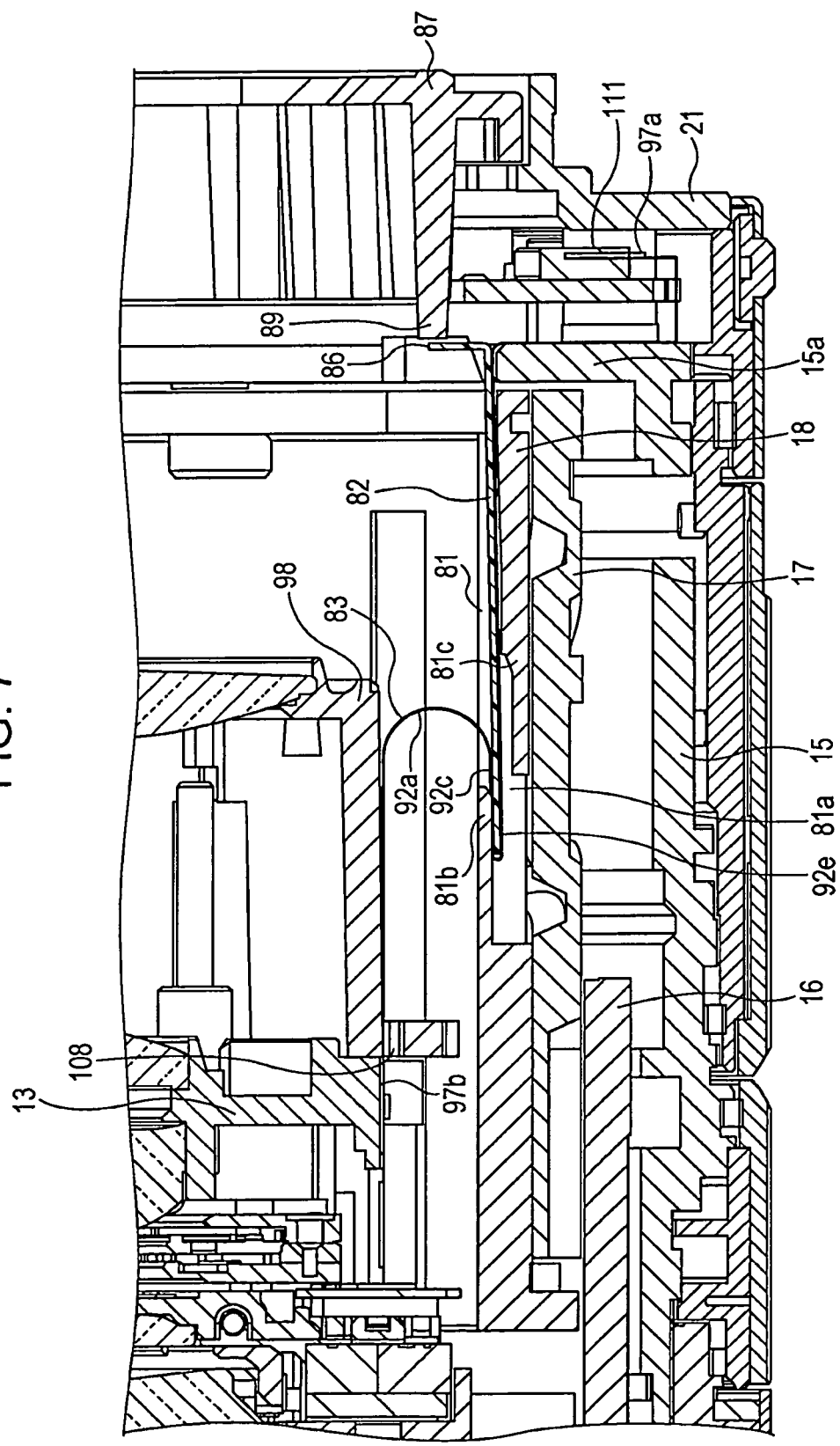
FIG. 7 is an enlarged explanatory view of the main portion of the lens barrel illustrated in FIG. 6.

As illustrated in FIGS. 4 and 6, the mechanical system of the lens barrel 1 includes a fixed ring 15, a body tube ring 16, a zoom cam ring 17, a fixed barrel 18, a zoom operating ring 19, a rear holding ring 20, a mounting ring 21, a focus operating ring 22, a front holding ring 23, and so forth. The fixed ring 15 is a tubular member serving as a framework of the mechanical system. An inner flange portion 15a, which extends in radially inward directions, is provided at one axial end of the fixed ring 15. The mounting ring 21 is secured to an outer surface of the inner flange portion 15a of the fixed ring 15 with screws (not shown). The lens barrel is detachably attached to the camera body 4 through the mounting ring 21 using a bayonet method.

The tubular body tube ring 16 is disposed inside the fixed ring 15. The tubular zoom cam ring 17 is disposed inside the body tube ring 16. The tubular fixed barrel 18 is disposed inside the zoom cam ring 17. The fixed barrel 18 is secured to an inner surface of the inner flange portion 15a with screws (not shown). The zoom cam ring 17 is rotatably supported by the fixed barrel 18 around the periphery of the fixed barrel 18. The zoom cam ring 17 is not moved (not extended) in the axial direction (the same direction as the optical axis direction) and is only allowed to rotate. The zoom cam ring 17 has a plurality of cam grooves in order to move the first lens group 7, the second lens group 8, and a third lens group unit 10 to predetermined positions.

Although it is not illustrated in the drawings, a cam pin provided in the body tube ring 16 is engaged with one of the cam grooves of the zoom cam ring 17. The body tube ring 16 has an axial groove extending in the axial direction, with which a guide pin is slidably engaged. The guide pin stands up on an outer peripheral surface of the fixed barrel 18 and is slidably engaged with the axial groove. By doing this, rotating the zoom cam ring 17 only causes the zoom cam ring 17 to rotate at a fixed position without moving in the optical axis direction. At this time, the body tube ring 16 is moved in the optical axis direction without being rotated. Linear guide grooves 80 that extend in the axial direction are formed in the fixed barrel 18. The linear guide grooves 80 guide the second group moving frame 12 and the third lens group unit 10 to move to predetermined positions.

The tubular zoom operating ring 19 having a predetermined length in the optical axis direction and the ring-shaped focus operating ring 22 also having a predetermined length in the optical axis direction are rotatably engaged with the fixed ring 15 at the outside of the fixed ring 15. The zoom operating ring 19 is disposed on the inner flange portion 15a side of the fixed ring 15. To an outer peripheral surface of the zoom operating ring 19, a zoom operating ring cover 25 that continues in the peripheral direction is bonded. The zoom operating ring 19 is capable of operating in conjunction with the zoom cam ring 17 using an engagement pin (not shown). The zoom cam ring 17 rotates at the same speed as the zoom operating ring 19 rotates. By rotating the zoom operating ring 19 at a fixed position, the first to third lens groups 7 to 9 are able to be moved to predetermined positions through the operation of the zoom cam ring 17, whereby zoom operation is achievable.

A potentiometer 24 that detects rotation angles of the zoom operating ring 19 is disposed inside the zoom operating ring 19. The ring-shaped rear holding ring 20 is disposed between the zoom operating ring 19 and the mounting ring 21. The rear holding ring 20 is secured to the fixed ring 15. A rear sheath cover 26 that continues in the peripheral direction is bonded to an outer peripheral surface of the rear holding ring 20.

The focus operating ring 22 is disposed on the side opposite the inner flange portion 15a side of the fixed ring 15. A focus operating ring cover 27 that continues in the peripheral direction is bonded to an outer peripheral surface of the focus operating ring 22. Rotation angles and the number of rotations of the focus operating ring 22 are detectable with a position detector (not shown). Focusing operation is performed in accordance with a detection signal that is output from the position detector and that detects rotational positions of the focus operating ring 22. That is, in accordance with the detection signal output from the position detector, a control device transmits a control signal to an electric motor provided in the third lens group unit 10 in order to move some of the lenses included in the third lens group unit 10 in the optical axis direction. Thus, focusing operation of the lens barrel 1 is achievable.

The focus operating ring 22, when mounted on the fixed ring 15, is removable toward the object side, which is one of the sides in the axial direction. The front holding ring 23 prevents the focus operating ring 22 from being removed toward the object side. The front holding ring 23 is formed as a ring-shaped member that is engageable with the fixed ring 15 at the outside of a distal end portion 15b on the object side of the fixed ring 15. The front holding ring 23 is configured as a removably connectable member using the bayonet method. A front sheath cover 28 that continues in the peripheral direction is bonded to an outer peripheral surface of the front holding ring 23. A through hole 29 is formed in an end surface of the front sheath cover 28. The through hole 29 has a size similar to the diameter of a hood end receiver 46 formed in a front end portion of the front holding ring 23.

A hood attaching groove 40 formed in a distal end portion 16a of the body tube ring 16 opposes the inside of the distal end portion 15b of the fixed ring 15. A lens hood (not shown) is removably connected to the distal end portion 16a of the body tube ring 16 using the bayonet method.

Figure 8:
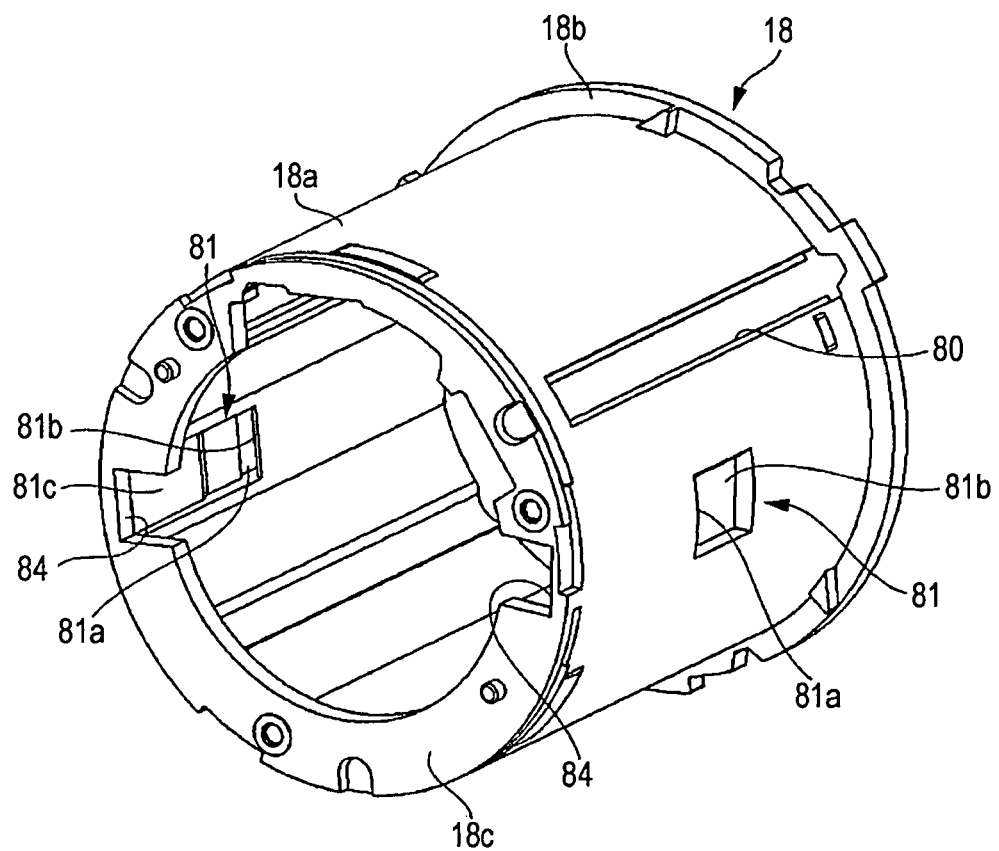
FIG. 8 is a perspective view of a fixed barrel of the lens barrel illustrated in FIG. 1.

FIG. 8 is a perspective view of the fixed barrel 18 seen from the rear side. The fixed barrel 18 includes a tubular body portion 18a, an outer flange portion 18b, and an inner flange portion 18c. The outer flange portion 18b is formed so as to extend in radially outward directions at one end in the axial direction of the body portion 18a. The inner flange portion 18c is formed so as to extend in radially inward directions at the other end in the axial direction of the body portion 18a. The body portion 18a of the fixed barrel 18 has the three linear guide grooves 80 (only one is illustrated in FIG. 8) that extend in the axial direction and two inclined fixing holes 81. The three linear guide grooves 80 are disposed at three positions and spaced apart from each other at equal angular intervals in the peripheral direction. The linear guide grooves 80 guide the third lens group unit 10 to linearly move in the optical axis direction.

The two inclined fixing holes 81 of the fixed barrel 18 are disposed at two positions in the peripheral direction and spaced apart from each other at equal angular intervals. Each inclined fixing hole 81 is used to fix a flexible circuit board 83 to the fixed barrel 18 using a flexible circuit board guide 82. The inclined fixing holes 81 each have a radial through hole portion 81a, an inner guide support portion 81b, and an outer guide support portion 81c. The radial through hole portion 81a penetrates through the body portion 18a in the radial direction, the inner guide support portion 81b is formed so as to be continuous with one side of the radial through hole portion 81a, and the outer guide support portion 81c is formed so as to be continuous with the other side of the radial through hole portion 81a. The inner guide support portion 81b is a portion that is continuous with the inclined fixing hole 81 formed in the body portion 18a on one side in the axial direction of the body portion 18a. The inner guide support portion 81b is formed by removing the radially outer side of the thickness of the body portion 18a. The outer guide support portion 81c is a portion that is continuous with the inclined fixing hole 81 formed in the body portion 18a on the other side in the axial direction of the body portion 18a. The outer guide support portion 81c is formed by removing the radially inner side of the thickness of the body portion 18a.

In the inclined fixing hole 81, the distance between the central axis of the fixed barrel 18 and a surface of the inner guide support portion 81b that receives the flexible circuit board guide 82 is set to be a value different from the distance between the central axis of the fixed barrel 18 and a surface of the outer guide support portion 81c that receives the flexible circuit board guide 82. In the present embodiment, the latter is set to be slightly smaller than the former.

That is, the dimensional relationship among those components is set in such a manner that an inclination angle α of the extending direction of the flexible circuit board guide relative to the optical axis OL of the lens barrel 1 is inclined at about 1 degree. In order to allow the flexible circuit board guides 82 to be mounted in the fixed barrel 18 such that each flexible circuit board guide 82 is inclined at about 1 degree relative to the fixed barrel 18, a cutout 84 is formed at a position corresponding to each inclined fixing hole 81 of the inner flange portion 18c. Each cutout 84 has a width and a depth that are sufficient to allow the flexible circuit board guide 82 to pass therethrough. The inclination angle α is preferably about 1 degree. However, the inclination angle is not limited to this and may be 0.5 degrees or 1.5 degrees.

Figure 11:
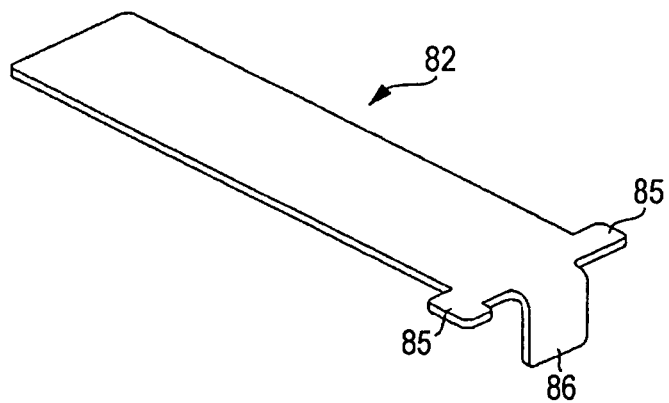
FIG. 11 is a perspective view of a flexible circuit board guide of the lens barrel illustrated in FIG. 1.

The flexible circuit board guide 82 has a shape as illustrated in FIG. 11. The flexible circuit board guide 82 is formed of a strip-shaped metal plate material of an appropriate length and width and has two positioning pieces 85 and a stopper piece 86 in one longitudinal side. The two positioning pieces 85 are formed so as to laterally protrude toward both sides in directions that intersect with the longitudinal direction of the flexible circuit board guide 82. The stopper piece 86 is formed by bending the flexible circuit board guide 82 at one longitudinal end through 90 degrees.

Figure 17:
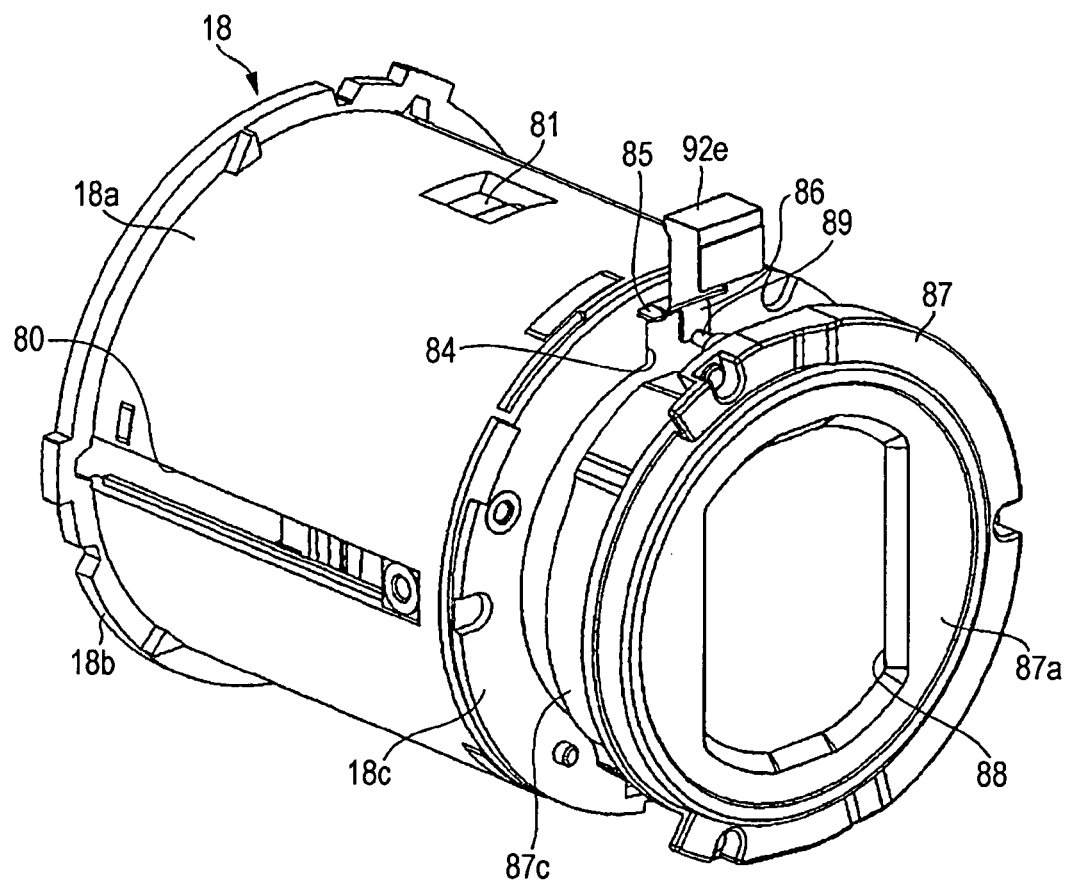
FIG. 17 is a perspective view of a main portion of the lens barrel illustrated in FIG. 1, illustrating the fixed barrel and the rear light shielding ring.
Figure 18:
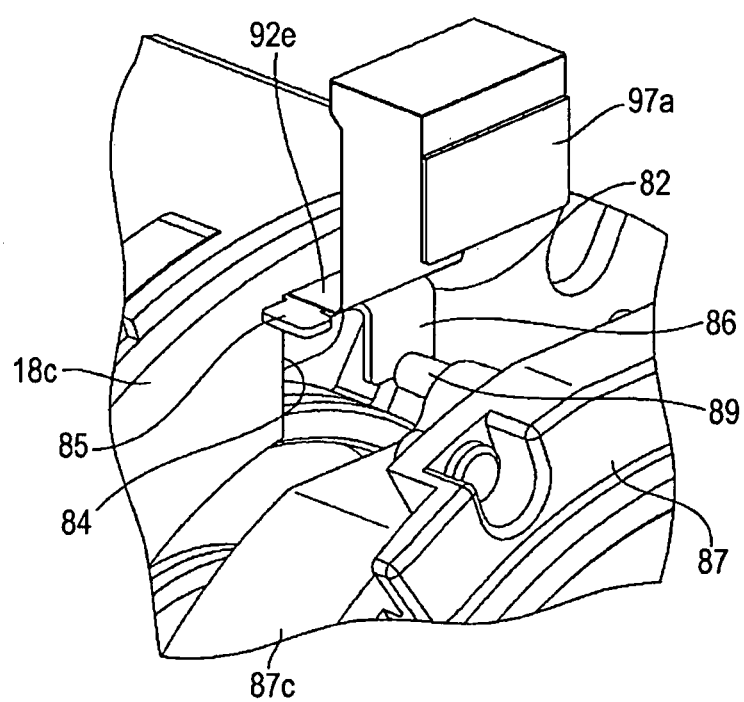
FIG. 18 is an enlarged explanatory view of the main portion of the lens barrel illustrated in FIG. 17.

As illustrated in FIG. 17, the length of the flexible circuit board guide 82 is preferably set to about such a length that allows the two positioning pieces 85 to come into contact with the inner flange portion 18c of the fixed barrel 18 in a state in which the distal end of the flexible circuit board guide 82 contacts the inner guide support portion 81b of the inner flange portion 18c when assembled to the fixed barrel 18. The width of the flexible circuit board guide 82 is set to about such a width that allows the flexible circuit board guide 82 to be inserted into the inclined fixing hole 81. The flexible circuit board guide is preferably formed of a metal such as stainless steel, steel, or spring steel. The flexible circuit board guide 82 may instead be formed of an engineering plastic having a certain degree of stiffness and high strength such as polyacetal (POM) or acrylonitrile butadiene styrene resin (ABS).

Figure 9A:
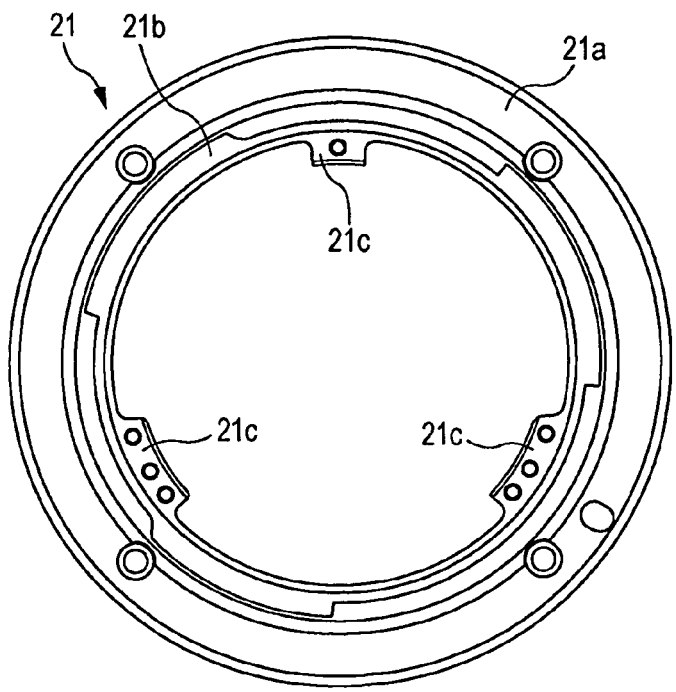
FIG. 9A is a front view of a mounting ring of the lens barrel illustrated in FIG. 1.
Figure 9B:
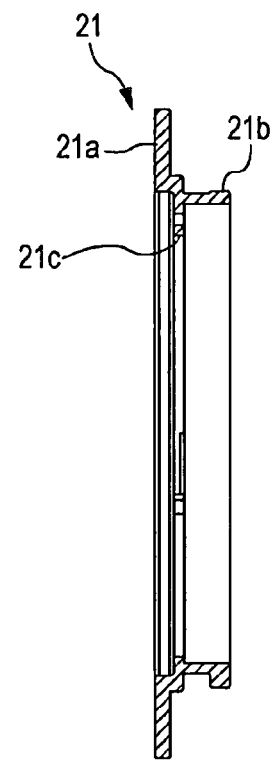
FIG. 9B is a longitudinal sectional view of the mounting ring of the lens barrel illustrated in FIG. 1 sectioned at a central portion.

The mounting ring 21, to which the fixed barrel 18 is secured, has a shape as illustrated in FIGS. 9A and 9B. The mounting ring 21 is formed of a ring-shaped member having a diameter slightly larger than that of the fixed barrel 18 and secured to the inner flange portion 18c of the fixed barrel 18 with fixing screws (not shown). The mounting ring 21 includes a fixing portion 21a and a bayonet portion 21b. The fixing portion 21a is secured to the inner flange portion 18c. The bayonet portion 21b is continuous with the fixing portion 21a and formed at a radially inside portion of the fixing portion 21a. With this bayonet portion 21b, the mounting ring 21 is connectable to the camera body 4. Attaching portions 21c to which a rear light shielding ring 87 is secured with screws are provided at three positions inside, the bayonet portion 21b.

Figure 10:
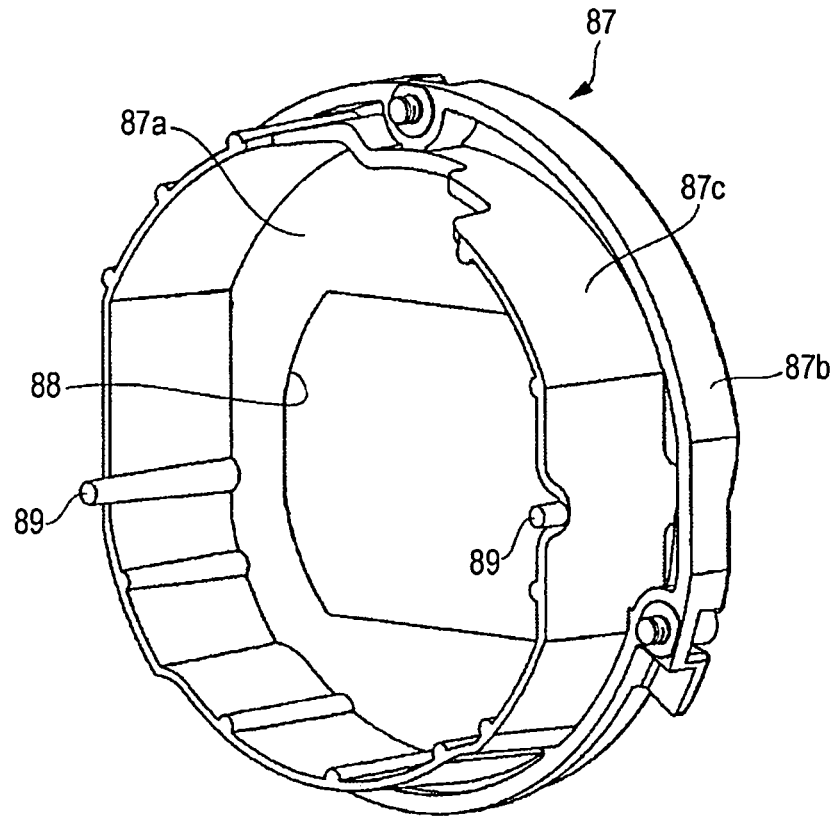
FIG. 10 is a perspective view of a rear light shielding ring of the lens barrel illustrated in FIG. 1.

The rear light shielding ring 87 has a shape as illustrated in FIG. 10. The rear light shielding ring 87 includes an end surface portion 87a, an outer edge portion 87b, and an inner wall portion 87c. The end surface portion 87a extends in a direction perpendicular to the optical axis direction. The outer edge portion 87b protrudes on one surface side along the outer edge of the rear light shielding ring 87. The inner wall portion 87c is spaced away from the outer edge portion 87b by an appropriate distance. The rear light shielding ring 87 has a through hole 88 in the central portion of the end surface portion 87a. The outside of the through hole 88 opposes an imaging element such as a charged-coupled device (CCD) or a complementary metal-oxide semiconductor (CMOS) provided in the camera body 4. The inner wall portion 87c is formed as a surrounding wall having a depth sufficiently larger than that of the outer edge portion 87b. Stopper protrusions 89 that prevent the flexible circuit board guides 82 from being removed are provided at separate two positions on the inner wall portion 87c. In the present embodiment, the two stopper protrusions 89 are spaced at about 180 degree intervals in the peripheral direction.

Figure 12:
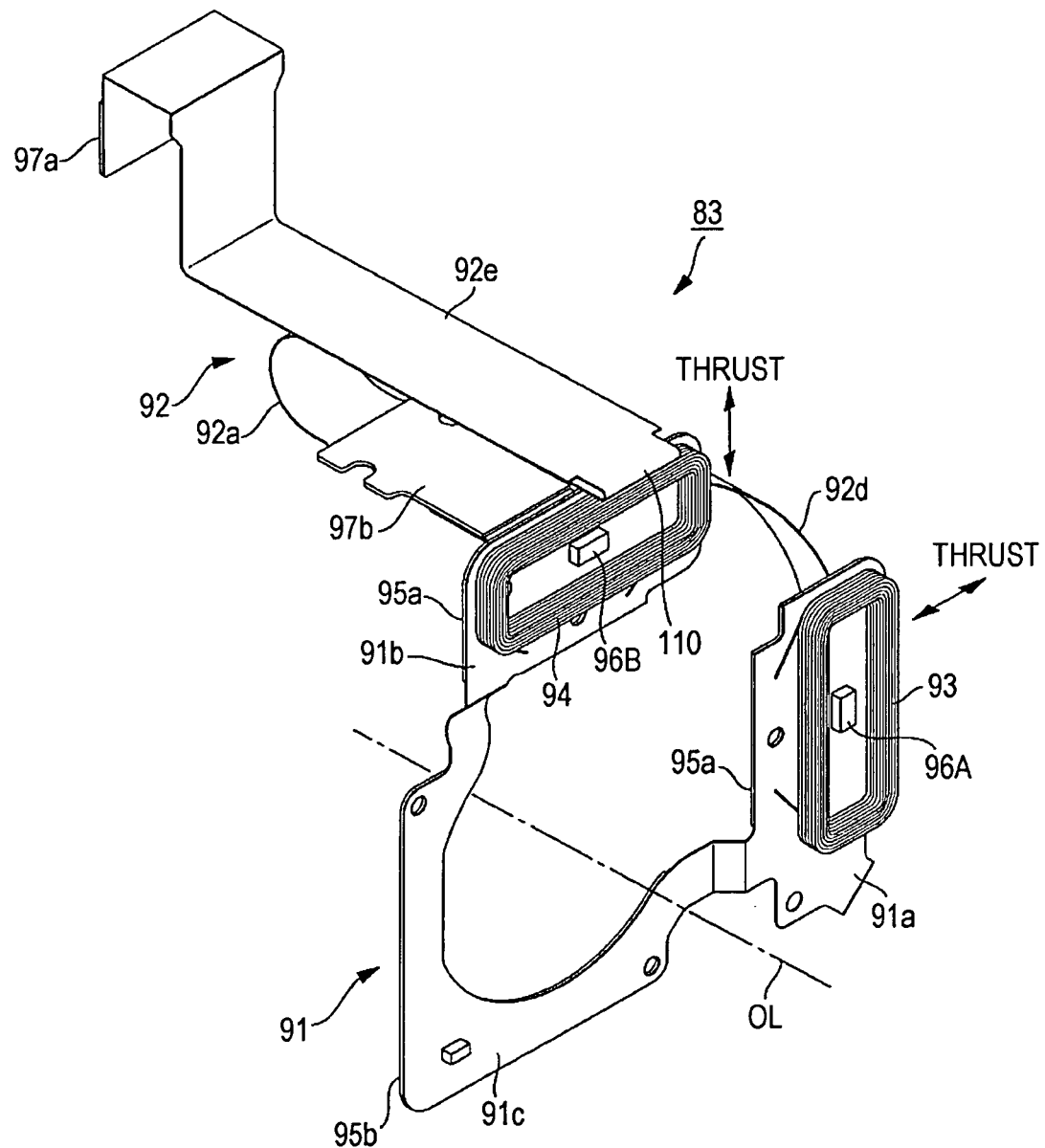
FIG. 12 is a perspective view of a flexible circuit board of an optical image stabilizer unit of the lens barrel illustrated in FIG. 1.
Figure 13:
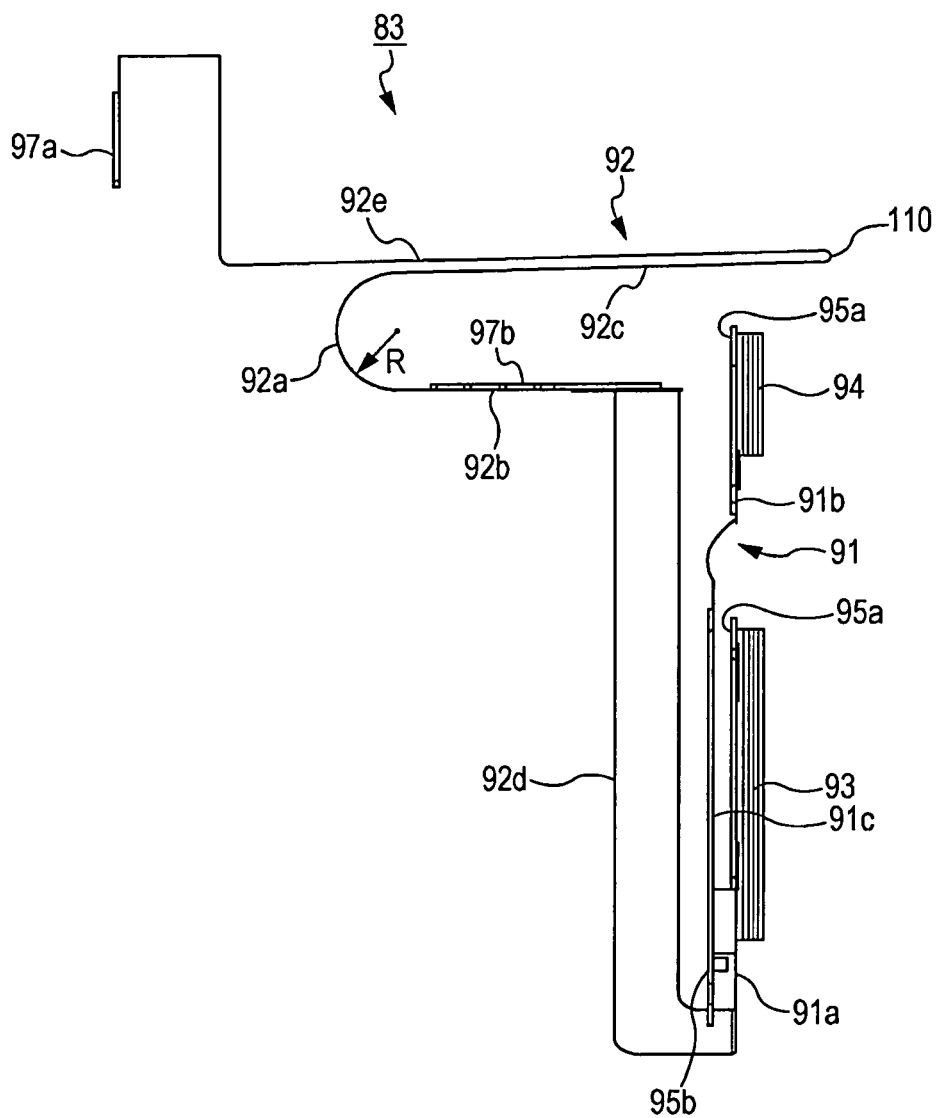
FIG. 13 is a side view of the flexible circuit board of the optical image stabilizer unit of the lens barrel illustrated in FIG. 1.

The flexible circuit board 83 in the present embodiment has a structure as illustrated in FIGS. 12 and 13. The flexible circuit board 83 is used for an optical image stabilizer unit that is incorporated in the third lens group unit 10. The flexible circuit board 83 includes an electronic component mounting portion 91 on which electronic components are mounted and a connection relaying portion 92 that connects the electronic component mounting portion 91 to the power source side. The electronic component mounting portion 91 includes a first coil mounting portion 91a, a second coil mounting portion 91b, and a connection portion 91c. A first drive coil 93 is mounted on the first coil mounting portion 91a, a second drive coil 94 is mounted on the second coil mounting portion 91b, and both first and second coil mounting portions 91a and 91b are connected to each other with the connection portion 91c. The electronic component mounting portion 91 is shaped so as to surround the optical axis of the lens barrel 1. The first coil mounting portion 91a is disposed on one side of the optical axis, and the second drive coil 94 is disposed at a position that is rotated through 90 degrees relative to the position of the first coil mounting portion 91a.

The first drive coil 93 and the second drive coil 94 are formed by winding wires into layers so as to have substantial rectangular shapes and disposed so as to make the longitudinal directions of the two drive coils 93 and 94 perpendicularly intersect each other. In the present embodiment, the first drive coil 93 is disposed lateral to the optical axis OL with the longitudinal direction thereof extending in the vertical direction, and the second drive coil is disposed above the optical axis with the longitudinal direction thereof extending in the horizontal direction. The two drive coils 93 and 94, which are respectively mounted on the coil mounting portions 91a and 91b, are electrically connected to circuits having predetermined shapes, and ready to be energized. Thus, when electric current flows through the first drive coil 93 and the second drive coil 94, a horizontal thrust is generated by the first drive coil 93 and a vertical thrust is generated by the second drive coil 94.

Each of the first coil mounting portion 91a and the second coil mounting portion 91b is provided with a coil back-up plate 95a. Position detectors (magnetoresistive sensor) 96A and 96B, which respectively detect the positions of the drive coils 93 and 94, are respectively disposed at the centers of the two drive coils 93 and 94. The connection portion 91c is formed to have a substantially L-shape. One side of the connection portion 91c is continuous with the first coil mounting portion 91a and the other side of the connection portion 91c is continuous with the second coil mounting portion 91b. The connection portion 91c is provided with a connection portion back-up plate 95b.

The connection relaying portion 92 of the flexible circuit board 83 includes a rounded portion 92a, a first linear portion 92b, a second linear portion 92c, a communicating portion 92*d*, and a folded portion 92*e*. The rounded portion 92*a* is movable while keeping a predetermined radius of curvature. The rounded portion 92*a* of the connection relaying portion 92 has a U-shaped portion that is bent through 180 degrees with the predetermined radius of curvature R. With the rounded portion 92*a*, deformation due to movement of the first linear portion 92*b*, which is a movable side relative to the second linear portion 92*c* or the fixed side, is absorbed. This facilitates the movement of the rounded portion 92*a*, thereby preventing damage to the flexible circuit board 83 and the like caused by the repetition of the movement.

One side of the rounded portion 92*a* is continuous with the first linear portion 92*b* of the connection relaying portion 92. The first linear portion 92*b* is continuous with the communicating portion 92*d*, which is continuous with the first coil mounting portion 91*a*. The second linear portion 92*c* is continuous with the other side of the rounded portion 92*a*. The second linear portion 92*c* is in turn continuous with the folded portion 92*e*. Connection terminals are provided in the end portion of the folded portion 92*e*. A terminal back-up plate 97*a* is provided in the end portion of the terminals. Also, a movable side back-up plate 97*b* is provided on the first linear portion 92*b*.

The flexible circuit board 83 having the above-described structure is, as illustrated in FIGS. 4 to 7, mounted between the third lens group unit 10 and the fixed barrel 18 so as to hang between the third lens group unit 10 and the fixed barrel 18. The electronic component mounting portion 91 of the flexible circuit board 83 and the first linear portion 92*b* of the connection relaying portion 92 are housed in the third lens group unit 10. The rounded portion 92*a*, which is continuous with the first linear portion 92*b*, is exposed in an area between the third lens group unit 10 and the fixed barrel 18. The distal end of the second linear portion 92*c* that is continuous with the rounded portion 92*a* is secured to the inclined fixing hole 81 of the fixed barrel 18 with the flexible circuit board guide 82.

The third lens group unit 10 includes the third group moving frame 13, a lens holder 98, an electric motor 99, and so forth. The third group moving frame 13 holds part of the third lens group 9, the lens holder 98 holds a proximal end lens 9*a* of the third lens group 9, and the electric motor 99 moves lenses (not shown) of the third lens group 9 in the optical axis direction. The lens holder 98 is formed of an open-ended cup-shaped member. The proximal end lens 9*a* is secured to the lens holder 98 so as to close the opening at the bottom. The third group moving frame 13 is disposed at a front opening of the lens holder 98 and secured to the lens holder 98 with fixing screws (not shown). The electric motor 99 is secured to the third group moving frame 13 and the lens holder 98 using a motor base 101.

Figure 15:
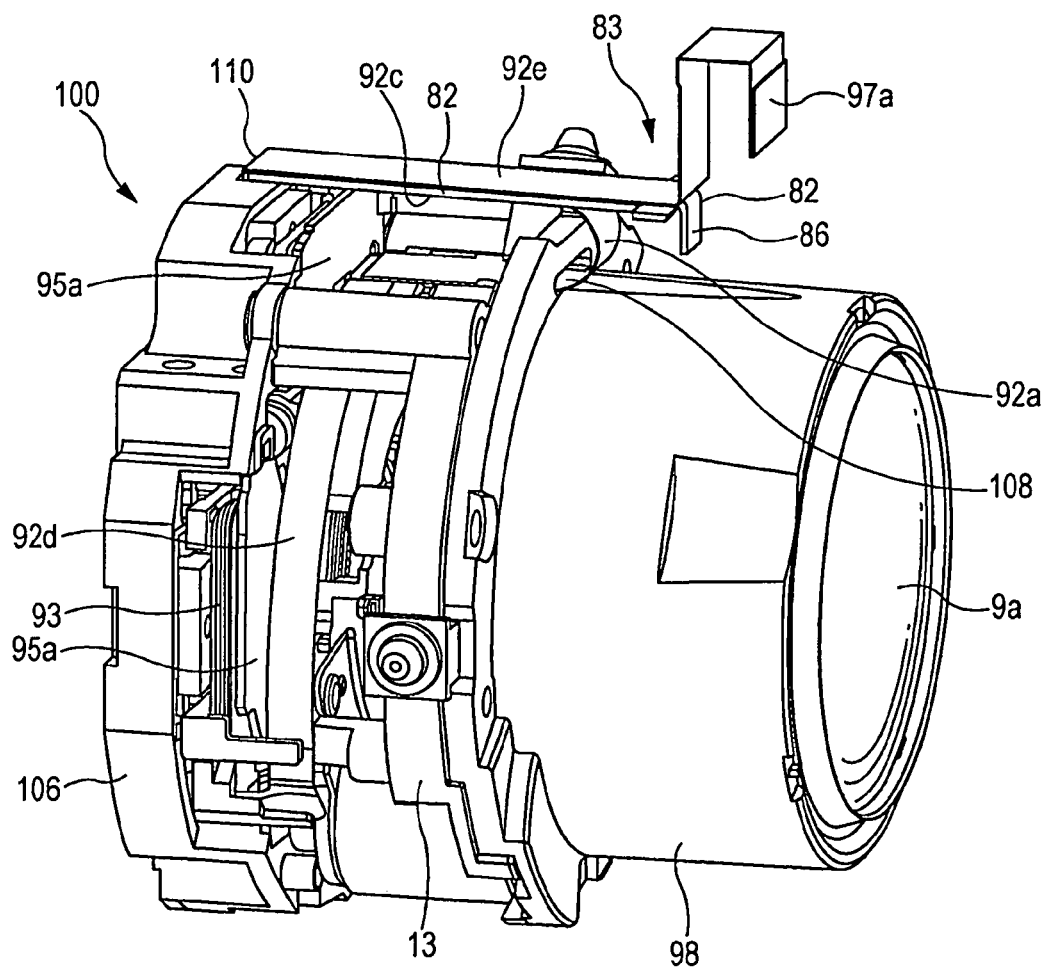
FIG. 15 is a perspective view of a third lens group of the lens barrel illustrated in FIG. 1.
Figure 16:
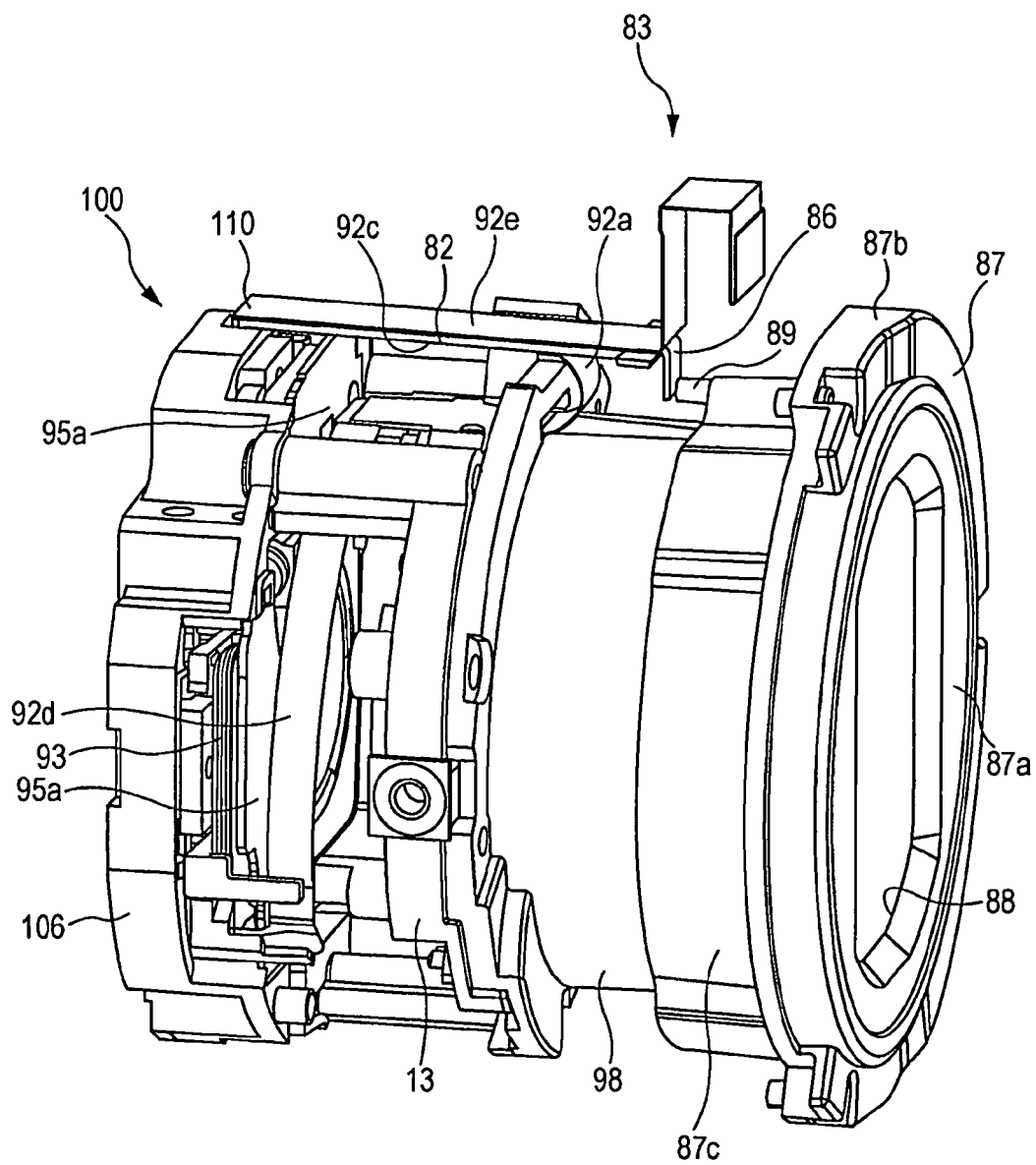
FIG. 16 is perspective view in which the rear light shielding ring is added to the third lens group illustrated in FIG. 15.

An optical image stabilizer unit 100 is disposed in front of the third group moving frame 13. An iris unit 14 is disposed in front of the optical image stabilizer unit 100. The optical image stabilizer unit 100 and the iris unit 14 are secured to the third group moving frame 13 and the lens holder 98 and movable in an integrated manner. The flexible circuit board 83 used for the optical image stabilizer unit 100 is integrated with the optical image stabilizer unit 100 in a state as illustrated in FIGS. 14 to 16.

Figure 14:
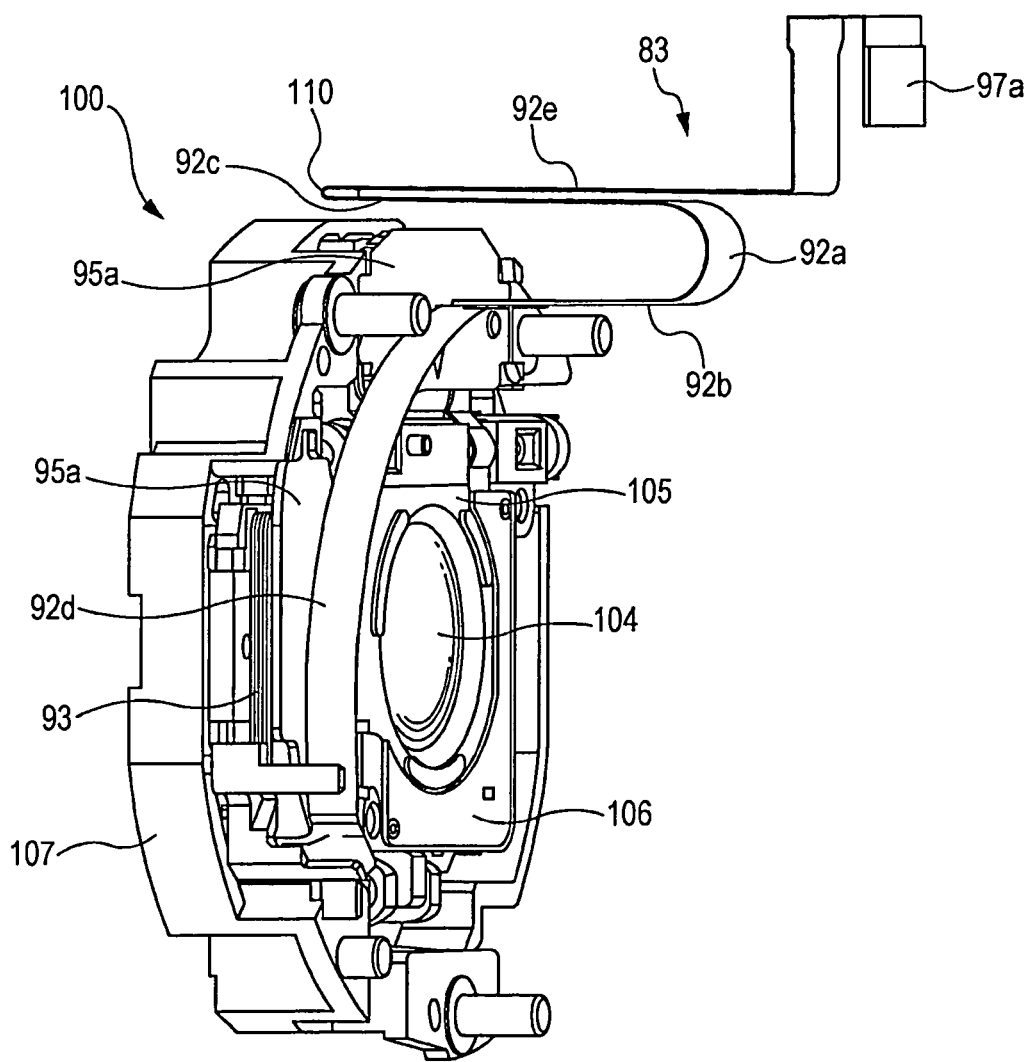
FIG. 14 is a perspective view of the optical image stabilizer unit of the lens barrel illustrated in FIG. 1.

FIG. 14 is a perspective view of the optical image stabilizer unit 100 seen from the third group moving frame 13 side. The optical image stabilizer unit 100 includes a correcting lens 104, a correcting lens holding frame 105, a holding frame holder 106, a correcting lens actuator, a unit case 107, and so forth. The correcting lens 104 is held by the correcting lens holding frame 105. The correcting lens holding frame 105 is supported by the holding frame holder 106 such that the correcting lens holding frame 105 is movable toward a first direction and a second direction that is perpendicular to the first direction within a predetermined range. The correcting lens actuator moves the correcting lens 104 toward the first and second directions using the correcting lens holding frame 105.

The correcting lens actuator includes magnets (not shown), the two drive coils 93 and 94, the flexible circuit board 83 on which the two drive coils 93 and 94 are mounted, and so forth. The unit case 107 holds the correcting lens holding frame 105, the holding frame holder 106, the correcting lens actuator, and so forth.

With the above-described optical image stabilizer unit 100, when the correcting lens 104 is moved due to, for example, camera shake while taking an image, a change of the position is detected by the two position detectors 96A and 96B. The two position detectors 96A and 96B output individual position detection signals, which are input to the control device (not shown). In accordance with the input position detection signals, the control device outputs control signals to the two drive coils 93 and 94 so as to make the optical axis of the correcting lens 104 match the optical axis OL of the lens barrel 1. As a result, due to a resultant force of a thrust directed in the first direction and another thrust directed in the second direction, which are generated by the drive coils 93 and 94, the correcting lens 104 is moved to make the optical axis thereof match the optical axis OL of the lens barrel 1. Thus, image blurring is suppressed when the optical axis of the correcting lens 104 matches the optical axis OL of the lens barrel 1. This permits an image of an object to be taken in a good state without image blurring.

The flexible circuit board 83 of the optical image stabilizer unit 100 having an above-described function is routed in a state as illustrated in FIG. 14 and mounted to the unit case 107. The electronic component mounting portion 91 of the flexible circuit board 83 is mounted inside the holding frame holder 106, and the communicating portion 92*d* of the connection relaying portion 92 is pulled out toward a side of the holding frame holder 106. In the electronic component mounting portion 91 of the present embodiment, the first coil mounting portion 91*a*, on which the first drive coil 93 is mounted, is disposed laterally to the optical axis OL, and the second coil mounting portion 91*b*, on which the second drive coil 94 is mounted, is disposed above the optical axis OL.

Also in the flexible circuit board 83, the first linear portion 92*b* of the connection relaying portion 92 is disposed near the second coil mounting portion 91*b*, and the second linear portion 92*c* is disposed above the first linear portion 92*b* away from the first linear portion 92*b* with a predetermined clearance provided therebetween. The predetermined clearance provided between the first linear portion 92*b* and the second linear portion 92*c* is defined by the radius of curvature of the rounded portion 92*a*. The rounded portion 92*a* is movable in the optical axis OL direction. The distal end of the flexible circuit board guide 82 is secured to part of the second linear portion 92*c*. The second linear portion 92*c* is continuous with the folded portion 92*e* through a bent portion 110. The flexible circuit board 83 is folded at the bent portion 110 into the second linear portion 92*c* and the folded portion 92*e*, between which the flexible circuit board guide 82 is inserted with the stopper piece 86 directed toward a radially inward direction.

In the flexible circuit board guide 82, a surface opposite a surface on which the stopper piece 86 protrudes are entirely secured to the folded portion 92*e* using double-sided tape. The connecting terminals are provided in the end portion of the folded portion 92*e* and electrically connectable to a connector 111. The end portion of the folded portion 92e is reinforced with the terminal back-up plate 97a. In the second linear portion 92c, only the distal end portion of the second linear portion 92c that is continuous with the folded portion 92e is bonded to the surface of the flexible circuit board guide 82 on which the stopper piece 86 protrudes using double-sided tape. Other portions of the second linear portion 92c are only in contact with the flexible circuit board guide 82. The second linear portion 92c passes through the through hole 108 formed in a flange portion of the lens holder 98 and is pulled out to the third lens group unit 10 side.

FIG. 16 illustrates a state in which the connection relaying portion 92 of the flexible circuit board 83 is secured to the fixed barrel 18 (not shown) with the flexible circuit board guide 82. FIG. 17 illustrates a state in which the fixed barrel 18 is added to the third lens group unit 10 in the state illustrated in FIG. 16. At this time, the flexible circuit board guide 82 and the like are inserted through the cutout 84 formed in the inner flange portion 18c of the fixed barrel 18. The distal end of the flexible circuit board guide 82 and the like are inserted into the inclined fixing hole 81 formed in the body portion 18a from the inside of the fixed barrel 18.

As a result, the flexible circuit board guide 82 is engaged with the inclined fixing hole 81 so as to bridge between the inclined fixing hole 81 in the optical axis direction and is mounted in the fixed barrel 18 as illustrated in FIGS. 4 to 7. At this time, the surface of the flexible circuit board guide 82 opposite the surface on which the stopper piece 86 protrudes faces the outer guide support portion 81c of the inclined fixing hole 81 with the folded portion 92e sandwiched therebetween. The distal end portion of the flexible circuit board guide 82 on the surface on which the stopper piece 86 protrudes faces the inner guide support portion 81b of the inclined fixing hole 81 with the second linear portion 92c sandwiched therebetween. At this time, the angle α formed between the extending direction of the flexible circuit board guide 82 that is engaged with the inclined fixing hole 81 and the optical axis OL is set to about 1 degree (see FIG. 4). That is, the flexible circuit board guide 82 is held so as to be inclined at about 1 degree relative to the optical axis OL of the lens barrel 1.

At this time, by making the positioning pieces 85 come into contact with the inner flange portion 18c of the fixed barrel 18, positioning of the flexible circuit board guide 82 in the optical axis direction and automatic settling of the flexible circuit board guide 82 in a predetermined depth are achievable. As FIGS. 4 to 7 and FIGS. 16 to 18 illustrate, the flexible circuit board guide 82 is also structured such that the stopper piece 86 of the flexible circuit board guide 82 secured to the fixed barrel 18 opposes the stopper protrusion 89 provided on the rear light shielding ring 87. The stopper protrusion 89 has a function that prevents the flexible circuit board guide 82 from being removed. In the present embodiment, two flexible circuit board guides 82 are used. The second flexible circuit board guide (not shown) similarly supports another flexible circuit board.

Figure 5:
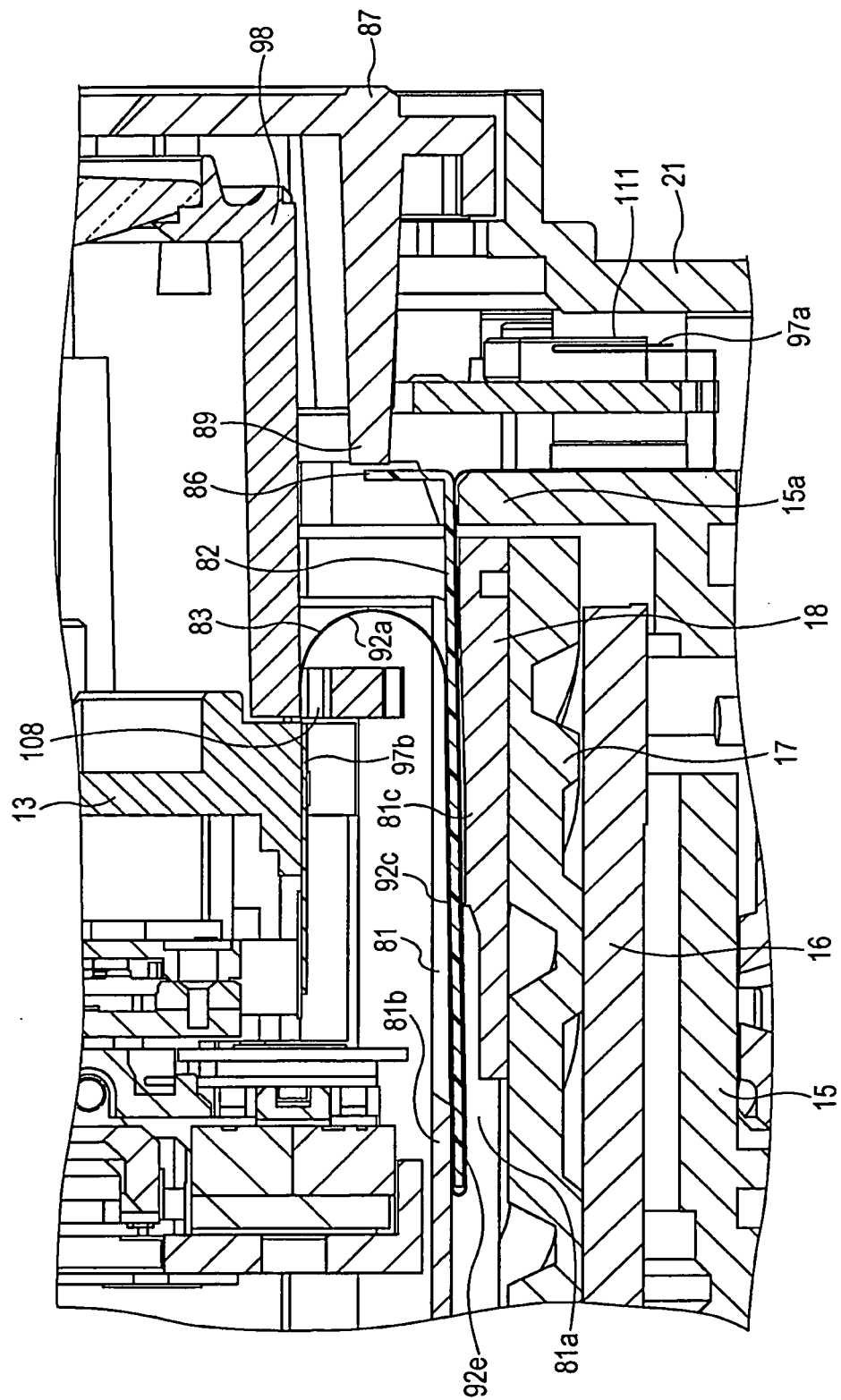
FIG. 5 is an enlarged explanatory view of a main portion of the lens barrel illustrated in FIG. 4.

The lens barrel 1 having the structure as described above operates, for example, as follows. That is, when the zoom operating ring 19 is rotated, the zoom cam ring 17 connected thereto with the engagement pin (not shown) rotates. The rotation of the zoom cam ring 17 causes the first to third lens groups 7 to 9 to move, thereby performing zoom operation. FIGS. 4 and 5 illustrate a wide-angle state of the lens barrel 1, which is the initial setting of the lens barrel 1. By rotating the zoom operating ring 19 in this state, the state of the lens barrel 1 is changed to a telephoto state illustrated in FIGS. 6 and 7, thereby performing the zoom operation.

That is, by rotating the zoom operating ring 19 to move the third lens group unit 10 forward in the optical axis OL direction, the electronic component mounting portion 91 of the flexible circuit board 83 is made to move in the same direction. At this time, the second linear portion 92c of the connection relaying portion 92 is pulled out, and the rounded portion 92a is made to move. This allows the movement of the third lens group unit 10 to be ensured and to be smoothly performed (see FIGS. 6 and 7). In so doing, although the third lens group unit 10 is disposed close to and immediately inside the fixed barrel 18, the second linear portion 92c of the flexible circuit board 83 enters the inclined fixing hole of the fixed barrel 18 (see FIGS. 4 and 5). This suppresses the probability of interference of the second linear portion 92c with the third lens group unit 10, and accordingly, prevents damage to the flexible circuit board 83 due to interference with other components.

The flexible circuit board guide 82 is housed in the fixed barrel 18 such that the one surface (front surface) and the other surface (rear surface) of the flexible circuit board guide 82 are clamped in the inclined fixing hole 81. Thus, the flexible circuit board guide 82 is not moved by a drive reaction force of the flexible circuit board 83. This allows the reaction force of the flexible circuit board 83 to be stabilized, the correcting lens 104 to be driven due to a change in the reaction force, and image blurring caused by the movement of the correcting lens 104 to be avoided. With respect to securing the flexible circuit board guide 82, when the rear light shielding ring 87 has been mounted to the mounting ring 21, the stopper protrusion 89 provided on the rear light shielding ring 87 comes close to the stopper piece 86 of the flexible circuit board guide 82, thereby preventing the flexible circuit board guide 82 from being removed. Thus, the flexible circuit board guide 82 is secured to the fixed barrel 18 without screws. This reduces the use of screws, and accordingly, allows the cost to be reduced.

In addition, the direction in which the flexible circuit board guide 82 extends is inclined at about 1 degree relative to the optical axis OL of the lens barrel 1. This allows a housing space of the flexible circuit board 83 to be contained within the thickness of the fixed barrel 18. Thus, creation of excess spaces in the radial direction is prevented, thereby contributing to reduction in size of the lens barrel 1. For example, if a clearance of 1 mm is provided in the radial direction of the fixed barrel 18, the diameter of the lens is increased by 2 mm. This significantly affects the structure of the lens barrel 1 and is incompatible with the demand for size reduction. Also, breaks in the flexible circuit board are more likely to occur if a tightly folded portion of the board is repeatedly stretched or bent. However, according to the embodiment of the present invention, the end portion of the tightly bent portion is held with the flexible circuit board guide, and the shape of the end portion does not change. This allows the probability of breaks occurring to be reduced as much as possible.

FIG. 19 is a perspective view of the appearance of the single lens reflex digital still camera 5 (referred to as the "digital still camera" hereafter) that indicates the first embodiment of the image-taking apparatus with which the above-described lens barrel 1 is usable. The digital still camera 5 includes the camera body 4, the lens barrel 1, and so forth. The camera body 4 includes a horizontally long casing and indicates an example of the first embodiment of the main body of an image-taking apparatus. The lens barrel 1 is detachably attached to the camera body 4.

The camera body 4, which is defined by a horizontally long casing having an internal space, houses circuit boards, a battery power source, a storage device, miscellaneous electronic and mechanical components and devices, and so forth in the internal space (not shown). A variety of electronic components are mounted on the circuit boards. A mounting portion 72, to which the lens barrel 1 is detachably attached, is provided in a substantially central portion on a front surface of the camera body 4. A grip portion 73 used to hold the camera body 4 is provided at the right of the front surface of the camera body 4. The grip portion 73 is formed such that the front surface of the camera body 4 protrudes forward, thereby facilitating the holding of the camera body 4 with one hand.

A flash unit 74, which emits illuminating light toward the object, is disposed in the substantially central portion in the upper surface of the camera body 4. The flash unit 74 is a pop-up built-in flash unit, the state of which is switchable between a retracted state illustrated in the figure and an upwardly protruded state (not shown). A shutter button for taking images of the object is provided on the grip portion 73 side in the upper surface of the camera body 4.

A mode selector dial 76 is disposed on the side opposite the grip portion 73 in the upper surface of the camera body 4. The mode selector dial 76 is a rotary switch used to select a desired function mode from among a number of camera functions of the digital still camera 5. Functions selectable with the mode selector dial 76 may include a variety of functions, for example, a mode for taking a still image, a mode for taking a moving image, a mode for regenerating and editing an image having been taken.

An electronic view finder 77 and a flat display panel (not shown) are disposed in a rear surface of the camera body 4. The flat panel display indicates a specific example of a display unit and includes a liquid crystal display (LCD). A variety of switches and the like used to perform operations such as selection of a variety of camera functions are provided around the flat display panel. By attaching the lens barrel 1 to the camera body 4 having the above-described structure, the digital still camera 5 including the interchangeable lens and the camera body 4 is achieved. It is clearly understandable that the lens barrel 1 may not be interchangeable but may be integrated with the camera body 4.

In order to take an image with the digital still camera 5, a power switch is initially turned on in order to cause the internal battery power source to supply power to the control device and the like. This enables the digital still camera 5 to perform image taking operation, and tasks such as ordinary image taking and continuous image taking are allowed to be performed by directing the image-taking lens toward the object and pressing the shutter button 75. When the image taking with the digital still camera 5 is finished, the image taking operation is disabled by turning off the power switch in order to stop the power supply from the battery power source.

According to the embodiment of the present invention, the risk that a U-turn shaped portion of the flexible circuit board may interfere with other parts is avoidable in the image-taking apparatus that uses the flexible circuit board having the U-turn shaped portion. Thus, the risk of the flexible circuit board being damaged is small, and by stabilizing the reaction force of the flexible circuit board, the risk of the occurrence of image blurring is reduced. Furthermore, the flexible circuit board is able to be secured only by inserting the flexible circuit board guide into a predetermined position. This allows ease of assembly to be improved and the number of components to be reduced due to the securing structure that does not use fixing screws. Thus, a lens barrel that is designed so as to be reduced in size is achieved.

Embodiments according to the present invention are not limited to the embodiment described above and illustrated in the drawings. It should be understood by those skilled in the art that various modifications may occur insofar as they are within the scope of the appended claims or the equivalents thereof. Although the above-described embodiment is an example in which a digital still camera is used as the image-taking apparatus, the lens barrel according to the present embodiment may be also applicable to, for example, digital video cameras, silver halide single lens reflex cameras, analog cameras, analog video cameras, monitoring cameras, and other image-taking apparatuses. Although the above-described example uses three lens groups as the optical lens, it is easily understandable that a four or more lens groups may be used.

What is claimed is:

1. A lens barrel comprising:
a fixed barrel;
a movable member that is movable relative to the fixed barrel;
a flexible circuit board that is bent in a U-shape and hangs between the fixed barrel and the movable member; and
a flexible circuit board guide that secures one side of the flexible circuit board that is continuous with the bent portion of the flexible circuit board to the fixed barrel while the one side of the flexible circuit board extends in a moving direction of the movable member,
wherein an inclined fixing hole is formed in the fixed barrel, the inclined fixing hole securing the flexible circuit board guide with the flexible circuit board guide being inclined relative to the moving direction the movable member.

2. The lens barrel according to claim 1,
wherein the inclined fixing hole is formed such that one side of the inclined fixing hole in the moving direction of the movable member contacts one surface of the flexible circuit board guide, and another side of the inclined fixing hole in the moving direction of the movable member contacts another surface of the flexible circuit board guide opposite the one surface of the flexible circuit board guide, and
wherein, in a direction perpendicular to the moving direction of the movable member, a distance between the movable member and the one side of the inclined fixing hole differs from a distance between the movable member and the other side of the inclined fixing hole.

3. The lens barrel according to claim 2,
wherein the one side of the flexible circuit board is arranged along one surface of the flexible circuit board guide, an end of the one side of the flexible circuit board is arranged around an area close to an end of another surface of the flexible circuit board guide, and another end of the one side of the flexible circuit board is led out toward the movable member.

4. An image-taking apparatus, comprising:
a lens barrel; and
a main body of the image-taking apparatus to which the lens barrel is secured or detachably attached,
wherein the lens barrel includes
a fixed barrel,
a movable member that is movable relative to the fixed barrel,
a flexible circuit board that is bent in a U-shape and hangs between the fixed barrel and the movable member, and
a flexible circuit board guide that secures one side of the flexible circuit board that is continuous with the bent portion of the flexible circuit board to the fixed barrel while the one side of the flexible circuit board extends in a moving direction of the movable member, in which an inclined fixing hole is formed in the fixed barrel, the inclined fixing hole securing the flexible circuit board guide with the flexible circuit board guide being inclined relative to the moving direction the movable member.

* * * * *